US008474180B2

(12) United States Patent
Berk et al.

(10) Patent No.: US 8,474,180 B2
(45) Date of Patent: Jul. 2, 2013

(54) METHOD AND SUBSTRATE FOR CULTIVATING A PLANT

(75) Inventors: Hugo Nicolaas Maria Berk, Aalsmeer (NL); Cornelis Jan Schoone, Heemskerk (NL); Dick Verweij, Monster (NL)

(73) Assignees: Idea Packaging B.V., Aalsmeer (NL); Schoone Orchideeen Research & Development B.V., Assendelft (NL); Potgrondverwerking van der Knapp B.V., Kwintsheul (NL)

( * ) Notice: Subject to any disclaimer, the term of this patent is extended or adjusted under 35 U.S.C. 154(b) by 376 days.

(21) Appl. No.: 12/945,379

(22) Filed: Nov. 12, 2010

(65) Prior Publication Data

US 2011/0113687 A1 May 19, 2011

(30) Foreign Application Priority Data

Nov. 16, 2009 (NL) .................................... 2003810

(51) Int. Cl.
*A01G 9/02* (2006.01)

(52) U.S. Cl.
USPC ............................................ 47/65.9; 47/66.7

(58) Field of Classification Search
USPC .................. 47/59 S, 63, 65.9, 66.5, 66.7, 73, 47/77, 78; D8/11; D11/155
See application file for complete search history.

(56) References Cited

U.S. PATENT DOCUMENTS

| 344,814 | A | * | 7/1886 | Carsley ............................. 47/73 |
|---|---|---|---|---|
| 3,949,523 | A | * | 4/1976 | Lehtipuu ........................... 47/77 |
| D248,022 | S | * | 5/1978 | Makilaakso ................. D11/155 |
| D262,350 | S | * | 12/1981 | Vincent ............................. D8/1 |
| D278,323 | S | * | 4/1985 | Blackmore, Jr. ............. D11/155 |
| 4,813,178 | A | * | 3/1989 | Ferrand ............................. 47/77 |
| 6,843,021 | B1 | * | 1/2005 | Huang ............................... 47/63 |
| 7,353,635 | B2 | * | 4/2008 | Westrate ........................... 47/76 |
| 2008/0078118 | A1 | * | 4/2008 | Bissonnette et al. ............. 47/63 |
| 2009/0166049 | A1 | * | 7/2009 | Gamble .......................... 172/22 |
| 2009/0272033 | A1 | * | 11/2009 | Paleari ............................. 47/74 |
| 2011/0113687 | A1 | * | 5/2011 | Berk et al. ..................... 47/65.9 |
| 2012/0137581 | A1 | * | 6/2012 | Teasdale ........................ 47/66.6 |

FOREIGN PATENT DOCUMENTS

GB 2045044 A * 10/1980
GB 2212376 A * 7/1989

* cited by examiner

*Primary Examiner* — Frank T Palo
(74) *Attorney, Agent, or Firm* — Nath, Goldberg & Meyer; Joshua B. Goldberg

(57) ABSTRACT

A method for cultivating a plant, wherein a substrate is formed, in which substrate a seed or a root of the plant is placed, which substrate containing the seed or the plant is placed in a holder for the plant to grow, characterized in that at least two substrate parts are formed, with the seed or a root of the plant being placed between said at least two substrate parts before the substrate containing the seed or the plant is placed in the holder.

14 Claims, 3 Drawing Sheets

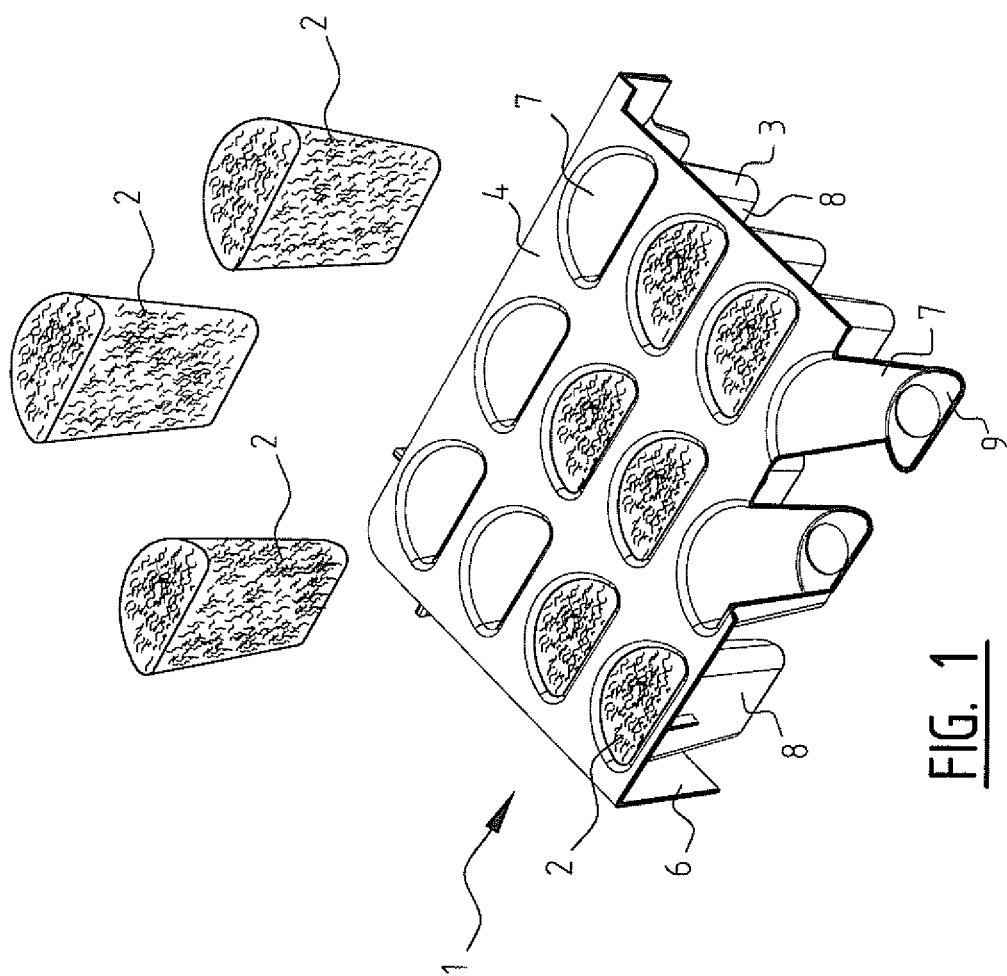

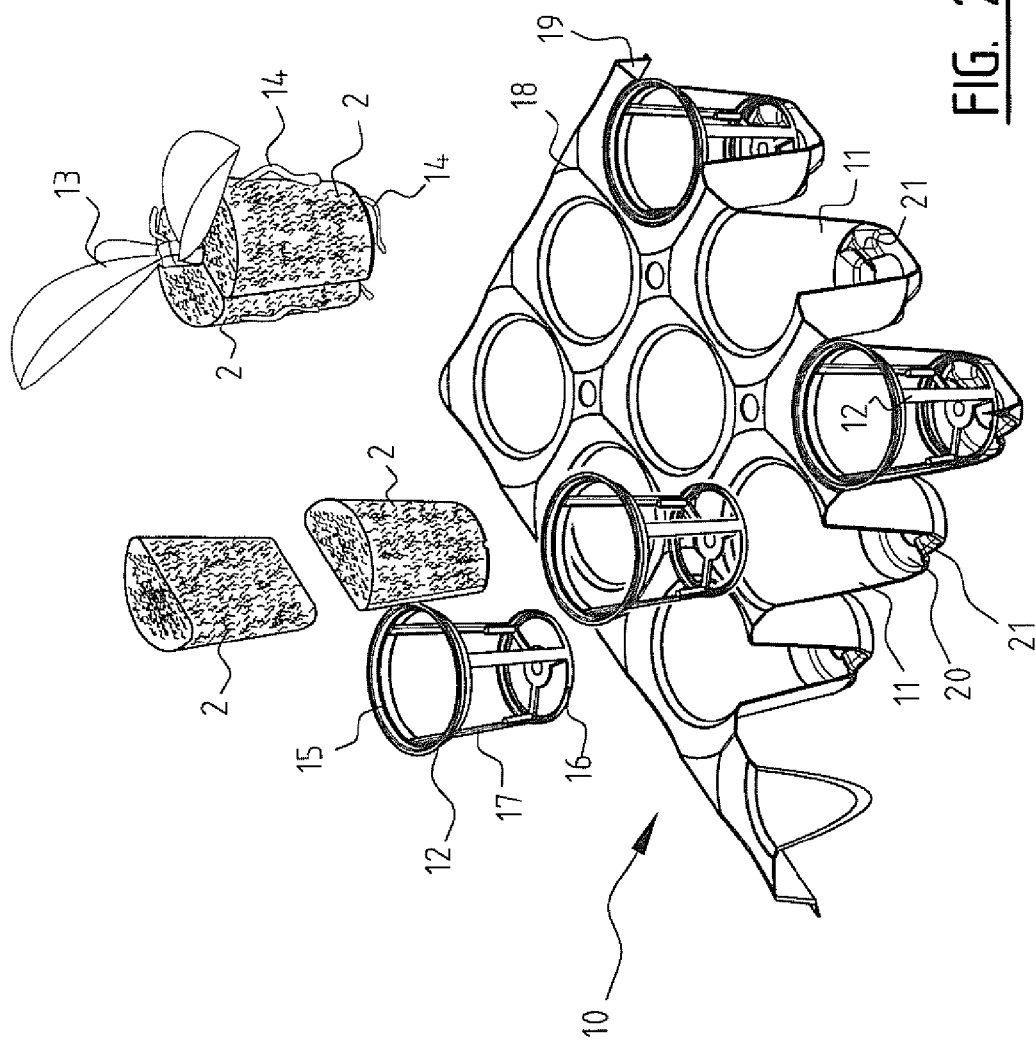

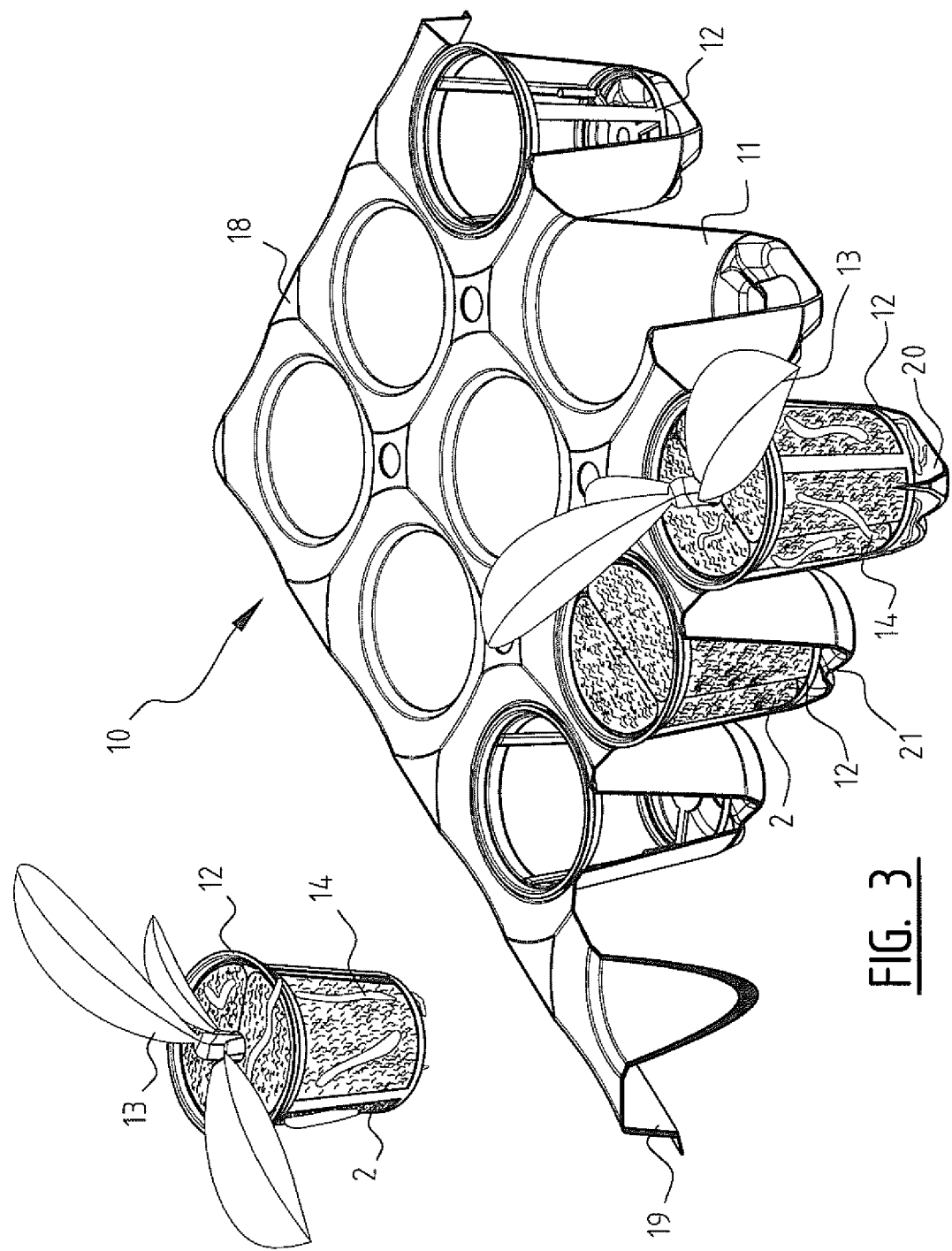

METHOD AND SUBSTRATE FOR CULTIVATING A PLANT

CROSS REFERENCE TO RELATED APPLICATIONS

This application is a U.S. Non-Provisional patent application, which claims priority to Dutch Patent Application No. 2003810, filed Nov. 16, 2009, which is incorporated herein in its entirety.

TECHNICAL FIELD

The invention relates to a method for cultivating a plant, wherein a substrate is formed, in which substrate a seed or a root of the plant is placed, which substrate containing the seed or the plant is placed in a holder for the plant to grow. The invention in particular relates to the raising of young plants, in particular flowering green plants, in particular epiphytes, more in particular of the orders bromeliaceae, araceae and asparagales, even more in particular of the families orchidaceae (apostasioideae and monandriae), specifically of the subfamilies cypridedioideae, vanilloideae, epidendroideae and orchidoideae.

BACKGROUND OF THE INVENTION

It is known to place young plants or plant seeds in a substrate consisting of a carrier (a so-called "plug") consisting of a material rich in fibre which is held together by means of an adhesive, and to place said plug in a cultivating tray, so that the roots of the plants remain separated. In this regard, the terms "seed" or "root" are to be understood to include: a rooted cutting, an unrooted cutting, a tissue culture of a plant, or a substrate ("plug") with a rooted plant. This method is not suitable for use with plants having already developed, vulnerable roots, however.

Such plants can be propagated from seeds, for example, or from cuttings. A problem which occurs in particular with epiphytic orchids and similar plants is that the aerial roots of orchids grow relatively long and in all directions in a short period of time. If for economic reasons the orchids are placed close together in a substrate, their roots will become entangled, making it difficult to separate the plants at a later stage. Another problem is that young roots may be damaged when the plants are transplanted. Another problem is that cultivated plants cannot be handled in an automated process.

SUMMARY OF THE INVENTION

The object of the invention is to provide a method for cultivating plants in a simple, reliable, efficient and inexpensive manner, and in particular to provide a method which helps solve the above problems.

The invention relates to a method for cultivating a plant, wherein a substrate is formed, in which substrate a seed or a root of the plant is placed, which substrate containing the seed or the plant is placed in a holder for the plant to grow.

The invention in particular relates to the raising of young plants, in particular flowering green plants, in particular epiphytes, more in particular of the orders bromeliaceae, araceae and asparagales, even more in particular of the families orchidaceae (apostasioideae and monandriae), specifically of the subfamilies cypridedioideae, vanilloideae, epidendroideae and orchidoideae.

In order to accomplish that object, at least two substrate parts are formed, with the seed or a root of the plant being placed between said at least two substrate parts before the substrate containing the seed or the plant is placed in the holder. In this way it is possible in a simple manner to assemble a plug which can be processed in a usual manner, whilst any damage to the roots of the plant is limited as much as possible.

The substrate parts and the seed or the root of the plant are preferably placed in a basket, which basket holds the substrate parts together, before the substrate containing the seed or the root of the plant is placed in the holder.

The substrate parts are preferably formed of a fibre mixture and an adhesive, such that the substrate parts form fixed units. The fibre mixture comprises coconut fibre, peat or other organic materials, for example, or an inorganic fibre material such as rock wool, for example.

The substrate parts preferably have a substantially semi-circular section, and the substrate preferably has a circular section. The substrate preferably has a substantially frusto-conical shape.

The substrate parts are preferably formed in a tray comprising a multitude of moulds. Said moulds preferably each have a semi-frustoconical shape with a semi-circular section.

The basket preferably comprises an upper circumferential edge, a lower circumferential edge and connecting edges interconnecting the two circumferential edges. Preferably, the side wall of the basket is at least 50%, preferably at least 70%, more preferably at least 90% open. The basket is made of plastic material, for example, but preferably the basket is made of a biodegradable material.

The holder is preferably frustoconical in shape. Preferably, a multitude of holders are formed in mutually adjacent relationship in a tray. The tray is preferably made of plastic material. The bottom of the holder is preferably provided with a hole.

The holder is preferably higher than the basket, and the basket is placed into the holder from above, such that a space is present in the holder under the basket.

The invention also relates to a substrate for cultivating a plant, in which substrate a seed or a root of the plant is placed. The substrate is preferably formed of at least two substrate parts, between which at least two substrate parts the seed or a root of the plant is placed.

The invention further relates to a partially frustoconical substrate part for cultivating a plant.

The invention also relates to a tray for forming partially frustoconical substrate parts, which tray comprises a multitude of moulds each having a semi-frustoconical shape with a semi-circular section.

The invention also relates to a basket comprising an upper circumferential edge, a lower circumferential edge and connecting edges interconnecting the two circumferential edges, wherein the side wall of the basket is at least 50%, preferably at least 70% open, even more preferably at least 90% open.

BRIEF DESCRIPTION OF THE DRAWINGS

The invention will now be explained in more detail with reference to an embodiment shown in the figures, in which:

FIG. 1 is a partially cutaway perspective view of a tray with moulds for forming substrate parts; and FIGS. 2 and 3 are perspective views of a system for cultivating orchids, in which use is made of substrate parts.

DETAILED DESCRIPTION

Exemplary embodiments of the invention are described in detail below with reference to the appended figures. The figures are not necessarily drawn to scale and do not necessarily show every detail or structure of the various embodiments of the invention, but rather illustrate exemplary embodiments and mechanical features in order to provide an enabling description of such embodiments.

FIG. 1 shows a filling tray 1 for forming the substrate parts 2. The filling tray 1 is made of a plate of plastic material. The filling tray 1 comprises moulds 3, which are interconnected by means of a plate-shaped material 4 near their removal openings. Along the circumferential edge, the plate-shaped material of the filling tray 1 is provided with a substantially vertical bearing wall 6, which can be supported on a flat supporting surface, such that the undersides of the moulds 3 are suspended some distance above the flat supporting surface.

The moulds 3 each have a semi-frustoconical shape, i.e. each mould has a first wall 7 which, seen in sectional view, is semi-circular in shape, wherein the diameter of the semicircle becomes smaller and smaller towards the bottom, and wherein each mould further has a straight vertical wall 8, which, together with the semicircular wall, forms a closed circumferential wall. At the bottom side of the mould, the circumferential wall is connected to a bottom 9, in which an opening is present.

The substrate parts 2 are formed by mixing a fibre mixture, such as coconut fibre or peat, for example, with an adhesive, such as a heated thermoplastic plastic material, in a manner which is known per se, and filling the moulds with said mixture and allowing the adhesive to cure. In this way semi-frustoconical substrate parts 2 ("partial plugs") are formed.

FIGS. 2 and 3 show a cultivating tray 10 comprising holders 11, baskets 12, substrate parts 2 and epiphytic orchids 13 with aerial roots 14 propagated from seeds or cuttings.

The baskets 12 are made up of a biodegradable plastic and comprise an upper ring 15, a smaller lower ring 16 with radial spokes, and three connecting wires 17, which connect the upper ring 15 to the lower ring 16. The basket 12 thus has a shape which corresponds to that of a frustoconical plug. The substrate parts 2 have an outer circumference which corresponds to and fits in the inner circumference of the baskets 12. Pairs of respective semi-frustoconical substrate parts 2 are placed in a basket 12, the straight walls of said parts butting against each other, with the interposition of the aerial roots 14 of the orchid 13.

The cultivating tray 10 is made of a plate of transparent material. The cultivating tray 10 comprises holders 11, which are interconnected by means of a plate-shaped material 18 near their upper openings. The plate-shaped material 18 surrounding the upper openings of the holders exhibits a slight inclination, such that liquid that falls between the openings of the holders will flow towards the holders 11. Along the circumferential edge, the plate-shaped material of the cultivating tray 10 is provided with a substantially vertical circumferential wall 19, which stabilizes the tray, and which is slightly outwardly inclined, so that several nested cultivating trays 10 can be stacked during storage.

The holders 11 each have a semi-frustoconical shape, i.e. each holder 11 has a circumferential wall 7 which, seen in sectional view, is circular in shape, with the diameter of the semicircle becoming smaller and smaller towards the bottom. The baskets have an outer circumference which corresponds to and fits in the inner circumference of the holders 11. At the bottom side of the holder 11, the circumferential wall is connected to a bottom 20, in which a drain hole is present.

Upright ribs 21 are formed on the bottom 20, on which ribs the bottom of a basket 12 can be supported, such that there is space for the aerial roots 14 of the orchids 13 to grow under the basket 12 in the holder 11. Alternatively, or simultaneously, the basket 12 may have dimensions or a shape such that the basket will remain suspended in the holder 11 and the aforesaid space will be present under the basket 12.

It is to be understood that the above embodiments and description only serve to illustrate the invention and that changes in structure, materials and modes of utilization are possible without departing from the spirit and scope of the invention.

We claim:

1. A method for cultivating a plant, wherein a substrate is formed, in which substrate a seed or a root of the plant is placed, which substrate containing the seed or the plant is placed in a holder for the plant to grow, characterised in that at least two substrate parts are formed, with the seed or a root of the plant being placed between said at least two substrate parts before the substrate containing the seed or the plant is placed in the holder.

2. A method according to claim 1, wherein the substrate parts and the seed or the root of the plant are placed in a basket, which basket holds the substrate parts together, before the substrate containing the seed or the root of the plant is placed in the holder.

3. A method according to claim 2, wherein the basket is made of a biodegradable material.

4. A method according to claim 2, wherein the holder is higher than the basket, and the basket is placed into the holder from above, such that a space is present in the holder under the basket.

5. A method according to claim 2, wherein the basket comprises an upper circumferential edge, a lower circumferential edge and connecting edges interconnecting the two circumferential edges.

6. A method according to claim 2, wherein the side wall of the basket is at least 50%, preferably at least 70%, more preferably at least 90% open.

7. A method according to claim 1, wherein the substrate parts are formed of a fibre mixture and an adhesive, such that the substrate parts form fixed units.

8. A method according to claim 1, wherein the substrate parts have a substantially semicircular section.

9. A method according to claim 1, wherein the substrate has a substantially frustoconical shape.

10. A method according to claim 1, wherein the substrate parts are formed in a tray comprising a multitude of moulds.

11. A method according to claim 1, wherein a multitude of holders are formed in mutually adjacent relationship in a tray.

12. A substrate for cultivating a plant, wherein a seed or a root of the plant is placed in the substrate, characterised in that the substrate is formed of at least two substrate parts, between which at least two substrate parts the seed or a root of the plant is placed.

13. The substrate according to claim 12, wherein at least one of the substrate parts is a partially frustoconical substrate part for cultivating a plant.

14. The substrate according to claim 13, further comprising a tray for forming partially frustoconical substrate parts, wherein the tray comprises a multitude of moulds each having a semi-frustoconical shape with a semi-circular section.

* * * * *